United States Patent
Nair et al.

(10) Patent No.: US 11,550,608 B2
(45) Date of Patent: Jan. 10, 2023

(54) GUEST-TO-HOST VIRTUAL NETWORKING (71) Applicant: INTERNATIONAL BUSINESS MACHINES CORPORATION, Armonk, NY (US)

(72) Inventors: Akshay Nair, Mountain View, CA (US); Phil Coulthard, Aurora (CA); Vadim Berestetsky, North York (CA); Farhan Arshad, Mississauga (CA); Aditya Jain, Brampton (CA); Hsing Gen Alexander Wu, Montréal (CA); Sami El Cheikh, Ottawa (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 356 days.

(21) Appl. No.: 16/670,639

(22) Filed: Oct. 31, 2019

(65) Prior Publication Data
US 2021/0132973 A1 May 6, 2021

(51) Int. Cl.
*G06F 9/455* (2018.01)
*H04L 61/3015* (2022.01)
(Continued)

(52) U.S. Cl.
CPC ...... *G06F 9/45558* (2013.01); *H04L 61/3025* (2013.01); *H04L 61/457* (2022.05); *G06F 2009/45595* (2013.01); *H04L 61/59* (2022.05)

(58) Field of Classification Search
CPC ....... G06F 9/45558; G06F 2009/45595; H04L 61/1511; H04L 61/1582; H04L 61/3025;
(Continued)

(56) References Cited

U.S. PATENT DOCUMENTS 2,931,666 A 11/1955 Burgmer
8,345,712 B2 1/2013 Sood et al.
(Continued)

FOREIGN PATENT DOCUMENTS

KR 20170088723 A * 8/2017 ............. H04L 45/74

OTHER PUBLICATIONS

Hesketh, A., "Getting Linux Virtual Machines on a Windows Host access to the Internet through an NTLM proxy," [online] Jan. 30, 2015, Adrian Hesketh © 2019, retrieved from the Internet: <https://adrianhesketh.com/2015/07/30/getting-linux-virtual-machines-on-a-windows-host-access-to-the-internet-through-an-ntlm-proxy/>, 5 pg.
(Continued)

*Primary Examiner* — Vivek Srivastava
*Assistant Examiner* — William C McBeth
(74) *Attorney, Agent, or Firm* — Cuenot, Forsythe & Kim, LLC (57) ABSTRACT

Guest-to-host virtual networking can include linking a virtual entity proxy to a network adapter of a host machine through a virtual bridge. In response to a request that starts a guest running on the host machine, the guest can be configured to point to the virtual entity proxy and to communicatively couple to a network through the virtual entity proxy linked to the network adapter of the host machine. The virtual entity proxy can be bound to the network, such that the virtual entity proxy intermediates communications between the guest and one or more other guests running on one or more different host machines that are also communicatively coupled to the network.

18 Claims, 5 Drawing Sheets

(51) Int. Cl.
*H04L 61/45* (2022.01)
*H04L 61/59* (2022.01)

(58) Field of Classification Search
CPC . H04L 61/6013; H04L 49/70; H04L 61/4511; H04L 61/457; H04L 61/59
See application file for complete search history.

(56) References Cited

U.S. PATENT DOCUMENTS

| | | | |
|---|---|---|---|
| 8,769,555 B2 | 7/2014 | Turk | |
| 9,197,489 B1 | 11/2015 | Vincent | |
| 9,237,087 B1* | 1/2016 | Risbood | H04L 45/00 |
| 9,619,272 B1 | 4/2017 | Mehat et al. | |
| 2005/0289648 A1* | 12/2005 | Grobman | G06F 9/45558 726/12 |
| 2006/0233168 A1* | 10/2006 | Lewites | H04L 12/462 370/389 |
| 2007/0101323 A1 | 5/2007 | Foley et al. | |
| 2012/0278461 A1* | 11/2012 | Wood | H04L 61/45 709/223 |
| 2013/0151685 A1* | 6/2013 | Bursell | G06F 9/45558 709/223 |
| 2015/0058968 A1* | 2/2015 | Wang | H04L 63/1466 726/12 |
| 2016/0080317 A1* | 3/2016 | Brandwine | G06F 9/45558 709/245 |
| 2018/0287938 A1* | 10/2018 | Han | H04L 61/1511 |
| 2018/0302243 A1* | 10/2018 | Li | H04L 49/70 |
| 2019/0173888 A1* | 6/2019 | Li | H04L 61/2539 |
| 2019/0273683 A1* | 9/2019 | Jiang | H04L 61/2007 |
| 2019/0349294 A1* | 11/2019 | Cardona | H04L 49/70 |
| 2020/0067876 A1* | 2/2020 | Sireling | G06F 9/45558 |

OTHER PUBLICATIONS

Pustina, L., "Lightweight Virtual Machines Made Simple with Docker or How to Run 100 Virtual Machines," [Online] codecentric Blog, Jan. 6, 2014, retrieved from the Internet: <https://blog.codecentric.de/en/author/lukas-pustina/>, 9 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

GUEST-TO-HOST VIRTUAL NETWORKING

BACKGROUND

This disclosure relates to computer virtualization, and more particularly, to networking virtual entities such as virtual machines and containers.

Virtualization enables a single computer to host multiple virtual machines, each potentially running a different operating system. One advantage of virtualization is that a failure in one virtual machine does not automatically bring down any other virtual machines. Another advantage is reducing the need for physical machines, thus economizing on hardware, power usage, and physical space. Virtualization also facilitates checkpointing and other system-related functions of a computer. For example, virtualization makes the migration of virtual machines for purposes of load balancing across multiple servers easier than migrating processes running on an ordinary operating system since migrating a virtual machine can be accomplished merely by moving the memory image. Moreover, because virtual machines can provide complete process isolation for applications, a problem in the host operating system is less likely to affect software running on the virtual machine (using a guest operating system) and vice versa. Another advantage is the ability of virtual machines to run legacy applications on operating systems or versions of such that are no longer supported or run on current computer hardware. With virtualization, legacy applications can run on the same hardware and at the same time as current applications.

A container typically includes processor-executable instructions as well as system tools, libraries, and settings. A container is not installed on a computer, in contrast with more traditional computer programs, and thus can be isolated from the other software and the operating system of a computer. A container includes the elements needed to execute in a single software package. A container runs on top of a container platform (e.g., Docker®), which is installed on an operating system. A container is considered to be "lightweight" in the sense that the container tends to require far less disk space than a virtual machine. Multiple containers can run side-by-side on a single container platform.

Virtual machines and containers can operate as complements with respect to one another. For example, multiple containers can run within a single virtual machine.

SUMMARY

In one or more embodiments, a method includes linking, with computer hardware defining a host machine, a virtual entity proxy to a network adapter of the host machine through a virtual bridge. The method can include responding to a request to start a guest running on the host machine by configuring the guest to point to the virtual entity proxy and to communicatively couple to a network through the virtual entity proxy linked to the network adapter of the host machine. The method also can include binding, with the computer hardware, the virtual entity proxy to the network, wherein the virtual entity proxy intermediates communications between the guest and another guest running on a different host machine communicatively coupled to the network.

In one or more embodiments, a system includes a processor configured to initiate operations. The operations include linking a virtual entity proxy to a network adapter of a host machine through a virtual bridge. The operations can include responding to a request to start a guest running on the host machine by configuring the guest to point to the virtual entity proxy and to communicatively couple to a network through the virtual entity proxy linked to the network adapter of the host machine. The operations also can include binding the virtual entity proxy to the network, wherein the virtual entity proxy intermediates communications between the guest and another guest running on a different host machine communicatively coupled to the network.

In one or more embodiments, a computer program product includes a computer readable storage medium having program instructions stored thereon. The program instructions are executable by a processor to initiate operations. The operations include linking a virtual entity proxy to a network adapter of a host machine through a virtual bridge. The operations can include responding to a request to start a guest running on the host machine by configuring the guest to point to the virtual entity proxy and to communicatively couple to a network through the virtual entity proxy linked to the network adapter of the host machine. The operations also can include binding the virtual entity proxy to the network, wherein the virtual entity proxy intermediates communications between the guest and another guest running on a different host machine communicatively coupled to the network.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer virtualization, and more particularly, to networking virtual entities. As defined herein, a "virtual entity" comprises processor-executable instructions that run on computer hardware. Correspondingly, the computer hardware defines a "host machine." The virtual entity executes, or runs, on the computer hardware as a "guest." Accordingly, a virtual machine is a virtual entity that as a guest executing on a host machine emulates or creates the functionality of a separate computer when running on the host machine. A container is a virtual entity that comprises a self-contained software package, including processor-executable instructions, system tools, libraries, and settings. Executing as a guest running on a host machine, the container can provide a distinct application program.

A virtual entity can connect to an external data communications network (e.g., Internet) through a bridge or adapter shared with the host machine on which the virtual entity runs as a guest. Multiple guests running on one or more host machines can be connected to each other by joining adapters together. The guests can comprise a blockchain network running on multiple host machines, for example. Different mechanisms, however, may be necessary for connecting a guest to a host machine depending on the specific configuration used to create the guest. Connecting a guest to a host machine, under certain conditions, may be difficult. Connecting guests running on different host machines can pose particular difficulties.

For example, if implemented as a virtual machine that communicates via a TCP/IP network, each guest may require a guest-specific IP address, thereby necessitating the availability of a unique IP address for each guest communicatively coupled to the network. The network settings may need to be individually specified manually for each guest's operating system. If the host machine (computer) runs one or more operating systems in virtual machines, each may need to be manually configured with a unique network address.

If guests are implemented as containers, for example, one or more container engines can provide the capability for creating user-defined bridges. A user-defined bridge can use a built-in DNS to automatically configure containers that communicate with one another other via an assigned name rather than an IP address and without requiring the manual addition of entries to a file (e.g., a Linux® /etc/hosts file) that associates IP addresses with host names for each corresponding container. Nevertheless, containers that run on different hosts, but that are not publicly accessible, may need a master DNS or manually configured /etc/hosts files to communicate with one another. For example, if two guests run on different hosts—hosts A and B and if a new guest is added to host A, then the new guest will require configuration of a built-in DNS or /etc/hosts file on host B to identify the new guest on host A, or addition of the new guest configuration into the master DNS that is used by both hosts A and B. Thus, it can be difficult to construct and maintain a network or subnet comprising multiple containers that run on separate hosts, but which, for the sake of protecting sensitive data, are not publicly accessible.

In accordance with the inventive arrangements disclosed herein, a guest connects with a host machine independent of the guest's configuration and without manual configuration of a corresponding file to associate addresses with host names for each corresponding guest. One aspect of the embodiments disclosed herein is the ability of multiple guests running on separate hosts to communicate with one another even though the entities are not necessarily configured to trust each other and are not publicly accessible on a network (e.g., via the Internet).

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
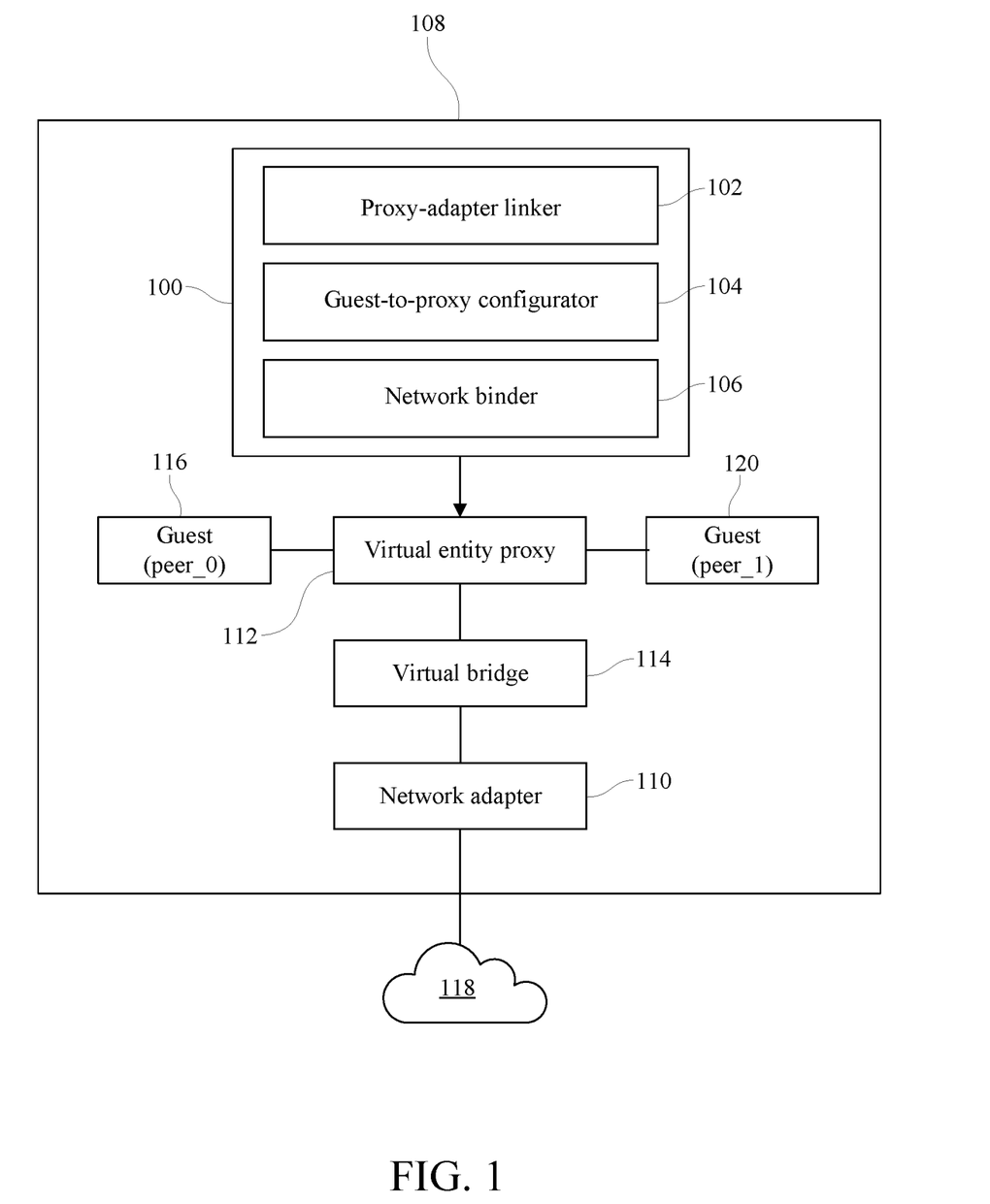
FIG. 1 depicts a system for guest-to-host virtual networking according to an embodiment of the present invention.

FIG. 1 depicts system 100, which illustrates an embodiment of a guest-to-host virtual networking system. System 100 illustratively comprises proxy-adapter linker 102, guest-to-proxy configurator 104, and network binder 106. Proxy-adapter linker 102, guest-to-proxy configurator 104, and network binder 106 can be implemented in processor-executable instructions that execute on the processor of a computer comprising hardware that includes one or more processors, memory, and bus that communicatively couples the one or more processors with the memory. An example of a computer capable of performing the operations described in connection with FIG. 1 is described in connection with FIG. 5. The computer hardware can define host machine 108 on which system 100 runs. In other embodiments, one or more of proxy-adapter linker 102, guest-to-proxy configurator 104, and/or network binder 106 can be implemented in dedicated hardware or a combination of dedicated hardware and processor-executable instructions.

Executing on host machine 108, system 100 can operatively couple to and operate in conjunction with a virtualization system (not explicitly shown) that also runs on host machine 108. The virtualization system can create multiple virtual machines and/or containers (jointly referred to as "guests" unless otherwise specified) configured to run on host machine 108. With bridged networking, a guest generated by the virtualization system can communicatively couple to a network or subnet via network adapter 110 of host machine 108.

Illustratively, in response to the virtualization system initiating or starting a guest running on host machine 108, system 100 utilizes the guest as virtual entity proxy 112, which proxy-adapter linker 102 links to network adapter 110 via virtual bridge 114. Virtual entity proxy 112, linked by proxy-adapter linker 102 to network adapter 110, can be the first of multiple guests initiated or started on host machine 108 by the virtualization system. Proxy-adapter linker 102 can link virtual entity proxy 112 to network adapter 110 by configuring virtual entity proxy 112 to incorporate and utilize the hosts file (a system facility for facilitating network addressing) of the host machine 108. For example, in a Linux® environment, virtual entity proxy 112 can be configured to incorporate and utilize the /etc/hosts file with the /etc/resolv.conf file the of host machine 108 to associate IP addresses with host names on a network and specify how host names on the network are resolved by matching the host names with corresponding IP addresses. Illustratively, the proxy-adapter linker 102 can generate a character string identifying the host machine 108 and inject the character string into the virtual entity proxy 112 by inserting the character string into the host name-resolution file of the virtual entity proxy 112. The character string can include a domain name of the host machine 108 and/or a network address of the host machine 108, and can be configured according to a predefined naming convention.

The virtualization system can generate multiple guests to run on host machine 108. Illustratively, running on host machine 108, the virtualization system can respond to a request to create or start another guest machine by starting guest 116. In response to the request, guest-to-proxy configurator 104 can configure guest 116 to point to virtual entity proxy 112 by generating a character string corresponding to a name for the virtual entity proxy 112 and injecting the character string into the guest 116, thus automatically linking the guest 116 to the virtual entity proxy 112. Guest-to-proxy configurator 104 can make virtual entity proxy 112 aware of guest 116 by injecting into the host file (e.g., /etc/hosts) incorporated in and utilized by virtual entity proxy 112 a character string naming guest 116. As defined herein, "injecting" means inserting a character string into, or adding the character string to, a host file. Guest-to-proxy configurator 104 can configure guest 116 to point to virtual entity proxy 112 by configuring guest 116 to use virtual entity proxy 112 as a network proxy. For example, in a Linux® environment, guest 116 can be configured to use virtual entity proxy 112 as a network proxy by executing the command "export http_proxy<virtual entity proxy address>."

Network binder 106 can bind virtual entity proxy 112 to network 118. As used herein, "binding" means creating a connection between the virtual entity proxy 112 and network 118 via network adapter 110 of host machine 108 thereby enabling exchanges of data over network 118. Thus, binding virtual entity proxy 112 to network 118 enables virtual entity proxy 112 to intermediate communications between guest 116 and other guests running different host machines communicatively coupled to network 118.

Illustratively, the virtualization network generates yet another guest, guest 120. In response, guest-to-proxy configurator 104 can inject into the host file (e.g., /etc/hosts) incorporated in and utilized by virtual entity proxy 112 another character string naming guest 120 and can configure guest 120 to use virtual entity proxy 112 as a network proxy. Accordingly, both guest 116 and guest 120 point to and access network 118 through virtual entity proxy 112. Virtual entity proxy 112 can intermediate communications between guests 116 and 120 and other guests running in different host machines communicatively coupled to network 118. Although only guests 116 and 120 are shown to illustrate certain operative features of system 100, it will be readily understood by one skilled in the art that the same operative features can apply with respect to more than two such guests. Moreover, for a network or subnet communicatively coupling multiple host machines, a virtual entity proxy can be created on each host machine. As a guest is added to the network or subnet, each virtual entity proxy can be configured to recognize the newly added guest by injecting into the host file (e.g., /etc/hosts) incorporated in and utilized by each virtual entity proxy the character string naming the newly added guest.

Each virtual entity proxy on each host machine can intermediate communications between guests running on different host machines communicatively coupled to a network or subnet. The character string naming a guest that points to a virtual entity proxy running on a host machine can be unique to that virtual entity proxy and to that host machine on which the virtual entity proxy is running. The character string naming a guest running on that host machine be based on a predefined naming convention. Thus, the guest can use the character string to name itself and thereby be identified by guests on other host machines as well as by other guests on the same host machine. For example, the guest's name can comprise the character string and a port number or identifier appended thereto. The virtual entity proxy can be configured to use a port-forwarding mechanism to forward messages to a specific guest based on the port number or identifier. A guest can broadcast the name (e.g., character string and port identifier) to guests on other host machines communicatively coupled to the same network by broadcasting the name to the virtual entity proxy running on the same host machine, which then broadcasts the name to other virtual entity proxies running in other host machines and to the guests communicatively linked thereto.

Guests 116 and 120, in some embodiments, can comprise containers that are part of a blockchain network comprising multiple guests, at least some of which run on different host machines and each of which is created by a proprietary or open source (e.g., Hyperledger®) blockchain tool. Each guest can be assigned a static name to communicate with other guests running on the same host machine. For example, peer_0 for guest 116 and peer_1 for guest 120. Guests running on different machines but deemed trusted entities can each be assigned a domain name. For example, a guest running on a first host machine can be assigned domain name peer.host1.com, and another guest running on a second host machine can be assigned domain name peer.host2.com.

Each guest (blockchain container) requires a name to exchange data with other guests. If guests running on different hosts are not deemed trusted entities—perhaps secure data interchanges of restricted data are involved, and the guests are not publicly accessible on a network, subnet, or the Internet—then a virtual entity proxy (e.g., virtual entity proxy 112) obviates the need for either a master DNS to resolve each name to a proper network address (e.g., IP address) or, alternatively, manually configuring of a name-resolution file (e.g., /etc/hosts file) with respect to each guest (e.g., guest 116 and guest 120). Instead, the character string identifying each guest is injected by a proxy-adapter linker (e.g., proxy-adapter linker 102) into the name-resolution file (e.g., /etc/hosts file) of a virtual entity proxy (e.g., virtual entity proxy 112) as each guest is created or starts running on a host machine, and each guest is configured to use the virtual entity proxy as a network proxy. Each guest-specific network request, accordingly, is redirected to the virtual entity proxy. Each virtual entity proxy on each distinct host machine, accordingly, can intermediate communications between guests running on different host machines that are communicatively coupled to the blockchain network.

Guests can use the injected character strings to name themselves, as described above. If bridged adapters are used, for example, the character string can comprise the host machine's external IP address, for example. Using a predetermined naming convention, each name can indicate a port corresponding to the guest for use with a port-forwarding mechanism. Based on a predefined naming convention, for example, a possible name structure can comprise a first portion that is the character string indicating the virtual entity proxy, a second that corresponds to the host machine's address, and a third corresponding to the guest's assigned port. Each guest can broadcast the name to other guests on other host machines through the virtual entity proxies running on the other host machines.

Among the advantages provided by system 100 is the system's ability to work in a non-Linux environment. Another is the system's compatibility for working in conjunction with an overlay filesystem. Still another is that, in an embodiment in which the guests are implemented as containers, the containers do not need to be reinitiated or restarted after manual configuration of a name-resolution file given that such a file is not needed in view of the indirection provided by a virtual entity proxy.

Figure 2:
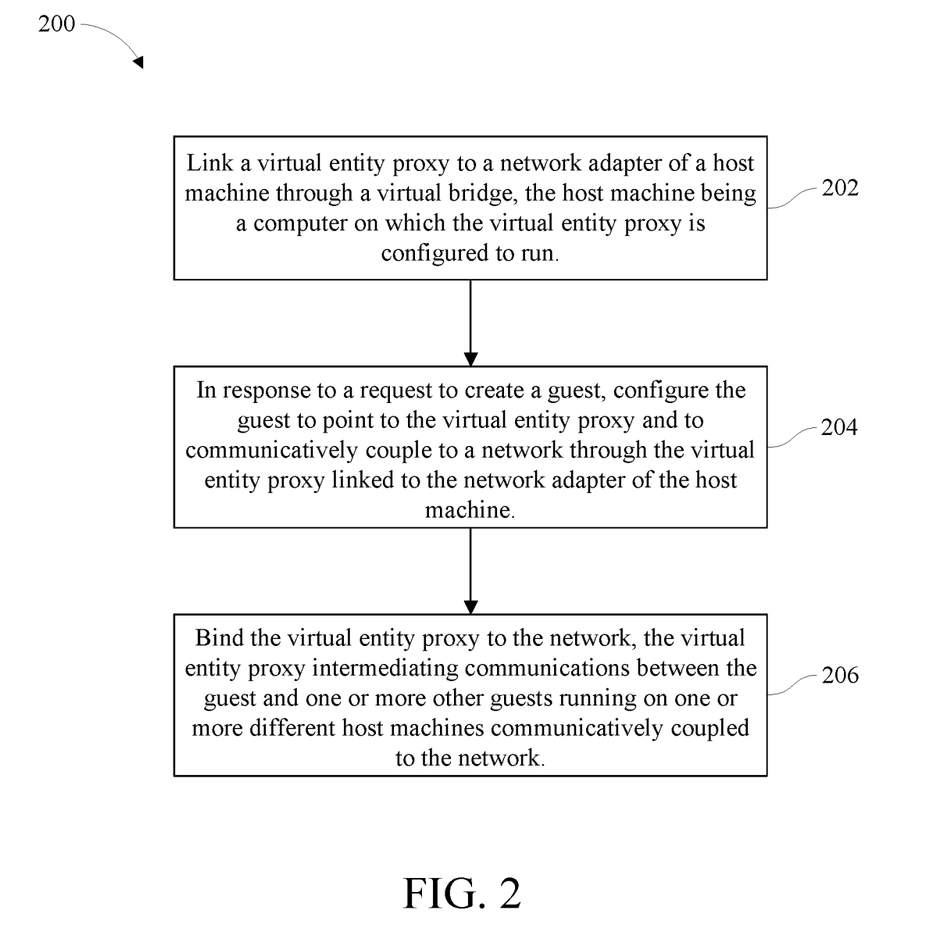
FIG. 2 is a flowchart of a method of guest-to-host virtual networking according to an embodiment of the present invention.

FIG. 2 is a flowchart of method 200, a method for guest-host virtual networking according to one embodiment. Method 200 can be performed by a system the same as or similar to the systems described in reference to FIG. 1. At block 202, the system links a virtual entity proxy to a network adapter of a host machine through a virtual bridge, the host machine being a computer on which the virtual entity proxy is configured to run. In response to a request to create or start a guest (e.g., virtual machine, container) running on the host machine, the guest at block 204 is configured to point to the virtual entity proxy and to communicatively couple to a network through the virtual entity proxy linked to the network adapter of the host machine. At block 206 the system binds the virtual entity proxy to the network. The virtual entity proxy, as configured, is capable of intermediating communications between the guest and one or more other guests running on one or more different host machines communicatively coupled to the network.

The linking at block 202 can comprise configuring the virtual entity proxy to incorporate and utilize the hosts file of the host machine. For example, the virtual entity proxy can be configured to incorporate and utilize the /etc/hosts file with the /etc/resolv.conf file of the host machine to associate IP addresses with host names on a network and specify how host names on the network are resolved by matching the host names with corresponding IP addresses The configuring at block 204 can comprise injecting a character string into a hosts file (e.g., /etc/hosts) incorporated in and utilized by the virtual entity proxy, the character string naming the guest. The configuring can also include configuring the guest to use the virtual entity proxy as a network proxy. For example, the guest can be configured to use virtual entity proxy as a network proxy by executing a command such as "export http_proxy<virtual entity proxy address>." The guest thus uses the injected character string to generate a guest name naming itself based on a predefined naming convention, the guest name incorporating the injected character string. The guest, optionally, can broadcast the guest name on the network. The broadcast can convey the guest name to other guests on other host machines through virtual entity proxies running on each of the host machines.

Embodiments of the present invention have been described in the context of various computing environments. The embodiments are capable of being implemented in conjunction with any other type of computing environment now known or later developed. One such computing environment, for example, is a cloud computing environment, though it is understood the teachings recited herein are not limited to a cloud computing environment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
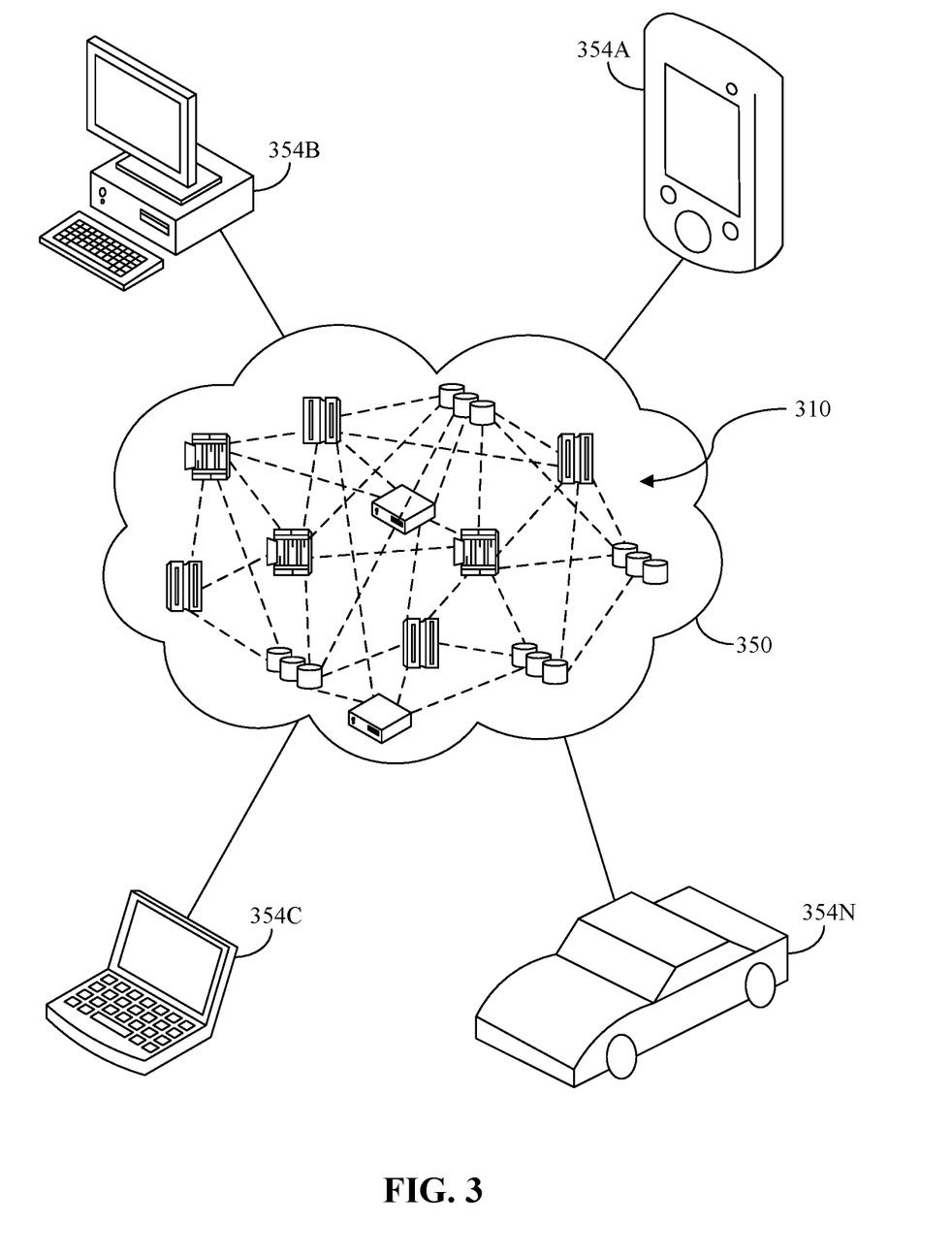
FIG. 3 depicts a cloud computing environment according to an embodiment of the present invention.

Referring now to FIG. 3, illustrative cloud computing environment 350 is depicted. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N may communicate. Computing nodes 310 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 3 are intended to be illustrative only and that computing nodes 310 and cloud computing environment 350 can communicate with any type of computerized device over any type of network and/or network addressable connection (e.g., using a web browser).

Figure 4:
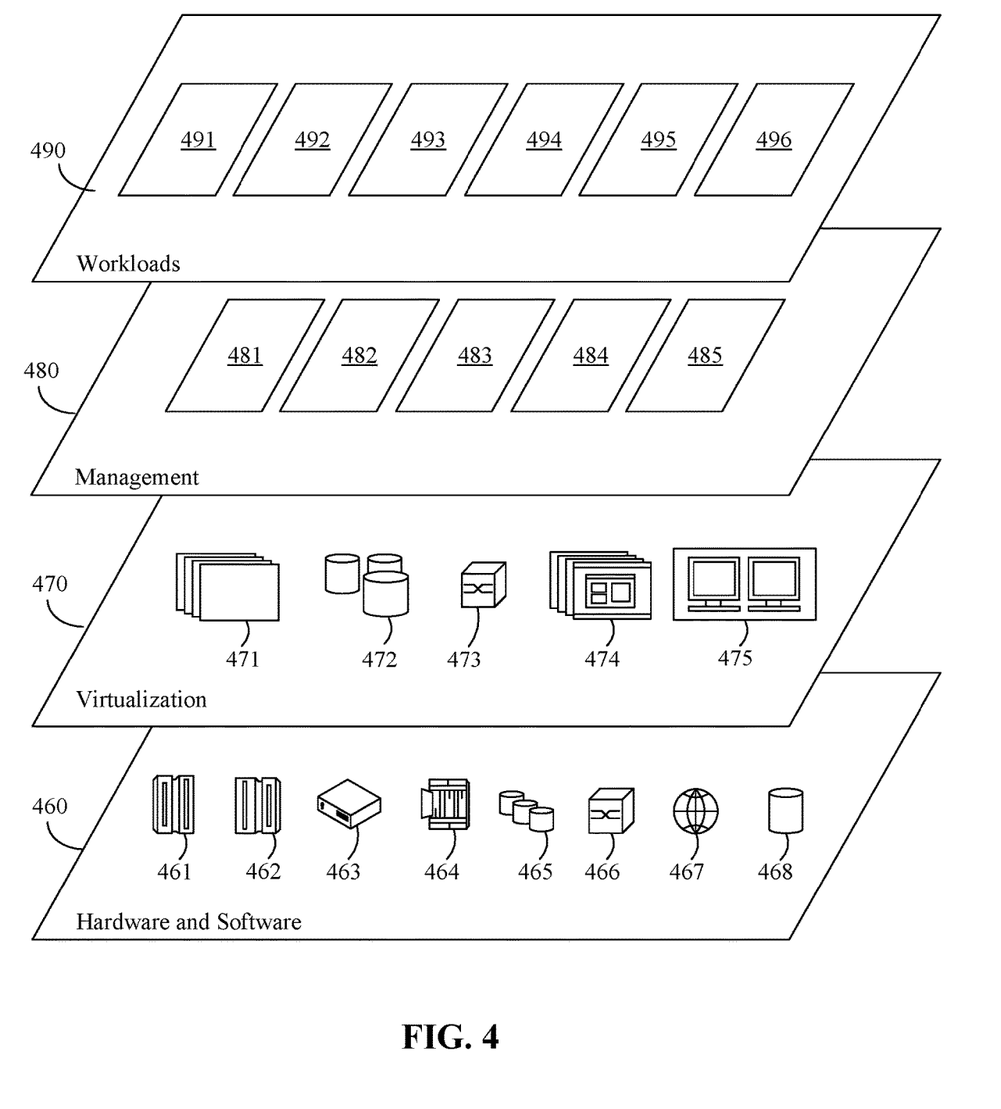
FIG. 4 depicts abstraction model layers according to an embodiment of the present invention.

Referring now to FIG. 4, a set of functional abstraction layers provided by cloud computing environment 350 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provides pre-arrangement for, and procurement of, cloud computing resources for which a future requirement is anticipated in accordance with an SLA. Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; and guest-to-host virtual networking 496.

Figure 5:
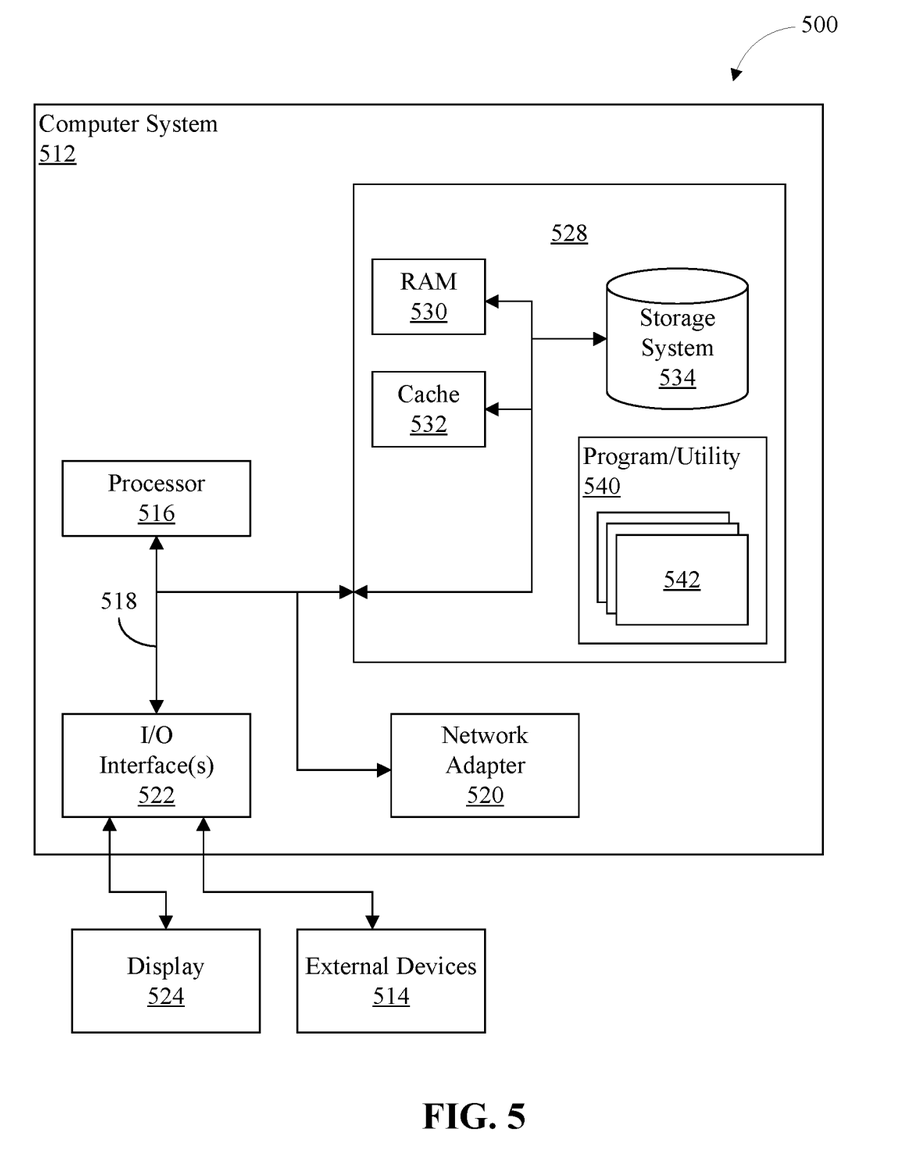
FIG. 5 depicts a cloud computing node according to an embodiment of the present invention.

FIG. 5 illustrates a schematic of an example computing node, computing node 500, for implementing various embodiments of the present disclosure. In one or more embodiments, computing node 500 illustrates a suitable server and/or cloud computing node. Computing node 500 is not intended to suggest any limitation as to the scope of use or functionality of embodiments of the invention described herein. Computing node 500 is capable of performing any of the functionality described within this disclosure.

Computing node 500 includes a computer system 512, which is operational with numerous other general-purpose or special-purpose computing system environments or configurations. Examples of well-known computing systems, environments, and/or configurations that may be suitable for use with computer system 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 512 may be described in the general context of computer system-executable instructions, such as program modules, being executed by a computer system. Generally, program modules may include routines, programs, objects, components, logic, data structures, and so on that perform particular tasks or implement particular abstract data types. Computer system 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system 512 is shown in the form of a general-purpose computing device. The components of computer system 512 may include, but are not limited to, one or more processors 516, a memory 528, and a bus 518 that couples various system components including memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 512 typically includes a variety of computer system readable media. Such media may be any available media that is accessible by computer system 512, and may include both volatile and non-volatile media, removable and non-removable media.

Memory 528 may include computer system readable media in the form of volatile memory, such as random-access memory (RAM) 530 and/or cache memory 532. Computer system 512 may further include other removable/non-removable, volatile/non-volatile computer system storage media. By way of example, storage system 534 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. For example, one or more of the program modules may include system 96 or portions thereof.

Program/utility 540 is executable by processor 516. Program/utility 540 and any data items used, generated, and/or operated upon by computer system 512 are functional data structures that impart functionality when employed by computer system 512. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 512 may also communicate with one or more external devices 514 such as a keyboard, a pointing device, a display 524, etc.; one or more devices that enable a user to interact with computer system 512; and/or any devices (e.g., network card, modem, etc.) that enable computer system 512 to communicate with one or more other computing devices. Such communication can occur via input/output (I/O) interfaces 522. Still yet, computer system 512 can communicate with one or more networks such as a local area network (LAN), a general wide area network (WAN), and/or a public network (e.g., the Internet) via network adapter 520. As depicted, network adapter 520 communicates with the other components of computer system 512 via bus 518. It should be understood that although not shown, other hardware and/or software components could be used in conjunction with computer system 512. Examples include but are not limited to microcode, device drivers, redundant processing units, external disk drive arrays, RAID systems, tape drives, and data archival storage systems, etc.

While computing node 500 is used to illustrate an example of a cloud computing node, it should be appreciated that a computer system using an architecture the same as or similar to that described in connection with FIG. 5 may be used in a non-cloud computing implementation to perform the various operations described herein. In this regard, the example embodiments described herein are not intended to be limited to a cloud computing environment. Computing node 500 is an example of a data processing system. As defined herein, the term "data processing system" means one or more hardware systems configured to process data, each hardware system including at least one processor programmed to initiate operations and memory.

Computing node 500 may include fewer components than shown or additional components not illustrated in FIG. 5 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As used herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

As used herein, "etc/resolv.config" refers to a plain-text file that specifies how host machine names on a network are resolved by identifying the resolution mechanisms to be used, such as a list of Domain Name Servers.

The terms "first," "second," etc. may be used herein to describe various elements. These elements should not be limited by these terms, as these terms are only used to distinguish one element from another unless stated otherwise or the context clearly indicates otherwise.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "processor" means at least one hardware circuit configured to carry out instructions. The instructions may be contained in program modules and may include routines, objects, components, logic, and/or data structures. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the phrases "in response to" and "responsive to" means responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, the term "runs" refers to the action in which a program comprising processor-executable instructions is being executed by one or more processors of a data processing system. A program in execution is termed a process and is associated with an address space (corresponding to memory locations) and a set of resources. The resources can include registers (e.g., including program counter and stack pointer), list of open files, list of related processes, and other resources and/or data needed to run the program.

As defined herein, the term "server" means a data processing system, whether implemented in computer hardware, processor-executable instructions (software), or a combination of computer hardware and software, configured to share services with one or more other such systems.

As defined herein, the term "start" indicates a transition of a virtual entity (e.g., a host machine guest) from a state where the virtual entity is not executing to a state where the virtual entity is executing on a host machine. Accordingly, start includes booting, restarting, or resuming execution of the virtual entity from a paused state.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   linking, with computer hardware defining a host machine, a virtual entity proxy to a network adapter of the host machine through a virtual bridge, the linking comprising generating a character string identifying the host machine and injecting the character string into the virtual entity proxy by inserting the character string into a host name-resolution file of the virtual entity proxy;
   in response to a request to start a guest running on the host machine, configuring the guest to point to the virtual entity proxy and to communicatively couple to a network through the virtual entity proxy linked to the network adapter of the host machine; and
   binding the virtual entity proxy to the network, wherein the virtual entity proxy intermediates communications between the guest and another guest running in a different host machine communicatively coupled to the network.

2. The method of claim 1, wherein the character string comprises a domain name of the host machine configured according to a predefined naming convention.

3. The method of claim 1, wherein the character string comprises a network address of the host machine.

4. The method of claim 1, wherein the configuring comprises generating a character string corresponding to a name for the virtual entity proxy and injecting the character string into the guest to automatically link the guest to the virtual entity proxy.

5. The method of claim 4, wherein the guest uses the character string to generate a guest name naming itself based on a predefined naming convention, the guest name incorporating the character string.

6. The method of claim 5, wherein the guest broadcasts the guest name on the network.

7. A system, comprising
   a processor of a host machine, the processor configured to initiate operations including:
      linking a virtual entity proxy to a network adapter of the host machine through a virtual bridge, the linking comprising generating a character string identifying the host machine and injecting the character string into the virtual entity proxy by inserting the character string into a host name-resolution file of the virtual entity proxy;
      in response to a request that starts a guest running on the host machine, configuring the guest to point to the virtual entity proxy and to communicatively couple to a network through the virtual entity proxy linked to the network adapter of the host machine; and
      binding the virtual entity proxy to the network, wherein the virtual entity proxy intermediates communications between the guest and another guest running a different host machine communicatively coupled to the network.

8. The system of claim 7, wherein the character string comprises a domain name of the host machine configured according to a predefined naming convention.

9. The system of claim 7, wherein the character string comprises a network address of the host machine.

10. The system of claim 7, wherein the configuring comprises generating a character string corresponding to a name for the virtual entity proxy and injecting the character string into the guest to automatically link the guest to the virtual entity proxy.

11. The system of claim 10, wherein the guest uses the character string to generate a guest name naming itself based on a predefined naming convention, the guest name incorporating the character string.

12. The system of claim 11, wherein the guest broadcasts the guest name on the network.

13. A computer program product comprising a computer readable storage medium having program instructions embodied therewith, the program instructions executable by a processor of a host machine to cause the processor to initiate operations comprising:

linking a virtual entity proxy to a network adapter of the host machine through a virtual bridge, the linking comprising generating a character string identifying the host machine and injecting the character string into the virtual entity proxy by inserting the character string into a host name-resolution file of the virtual entity proxy;

in response to a request that starts a guest running on the host machine, configuring the guest to point to the virtual entity proxy and to communicatively couple to a network through the virtual entity proxy linked to the network adapter of the host machine; and     binding the virtual entity proxy to the network, wherein the virtual entity proxy intermediates communications between the guest and another guest running a different host machine communicatively coupled to the network.

14. The computer program product of claim 13, wherein the character string comprises a domain name of the host machine configured according to a predefined naming convention.

15. The computer program product of claim 13, wherein the character string comprises a network address of the host machine.

16. The computer program product of claim 13, wherein the configuring comprises generating a character string corresponding to a name for the virtual entity proxy and injecting the character string into the guest to automatically link the guest to the virtual entity proxy.

17. The computer program product of claim 16, wherein the guest uses the character string to generate a guest name naming itself based on a predefined naming convention, the guest name incorporating the character string.

18. The computer program product of claim 17, wherein the guest broadcasts the guest name on the network.

* * * * *